US012122192B2

(12) United States Patent
Pierre et al.

(10) Patent No.: US 12,122,192 B2
(45) Date of Patent: Oct. 22, 2024

(54) PNEUMATIC TIRE WITH A TEXTURED SURFACE, METHOD OF MANUFACTURING, AND TEXTURED MOLD

(71) Applicant: Bridgestone Americas Tire Operations, LLC, Nashville, TN (US)

(72) Inventors: Stephen J. Pierre, Polk City, IA (US); Jared D. Lofland, Ankeny, IA (US); Andrew J. Minor, Bondurant, IA (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 567 days.

(21) Appl. No.: 16/642,034

(22) PCT Filed: Sep. 20, 2018

(86) PCT No.: PCT/US2018/051900
§ 371 (c)(1),
(2) Date: Feb. 26, 2020

(87) PCT Pub. No.: WO2019/060517
PCT Pub. Date: Mar. 28, 2019

(65) Prior Publication Data
US 2020/0247077 A1    Aug. 6, 2020

Related U.S. Application Data

(60) Provisional application No. 62/561,704, filed on Sep. 22, 2017.

(51) Int. Cl.
*B60C 13/00* (2006.01)
*B29D 30/06* (2006.01)
*B29D 30/72* (2006.01)

(52) U.S. Cl.
CPC ........ *B60C 13/001* (2013.01); *B29D 30/0606* (2013.01); *B29D 30/72* (2013.01); *B29D 2030/0612* (2013.01); *B29D 2030/726* (2013.01)

(58) Field of Classification Search
CPC ............... B29D 30/0606; B29D 30/72; B29D 2030/0612; B29D 2030/726;
(Continued)

(56) References Cited

U.S. PATENT DOCUMENTS

| 4,823,856 A | 4/1989 | Roberts |
| 5,807,446 A | 9/1998 | Ratliff, Jr. |

(Continued)

FOREIGN PATENT DOCUMENTS

| DE | 4111345 A1 | 11/1991 |
| DE | 102012104890 A1 | 12/2013 |

(Continued)

OTHER PUBLICATIONS

Iwamura K, JP-2003252012-A, machine translation. (Year: 2003).*
(Continued)

*Primary Examiner* — Sedef E Paquette (57) ABSTRACT

A tire mold having a sidewall molding surface with a negative irregular rough surface texture pattern extending circumferentially along the sidewall molding surface so as to mold at least one annular exterior surface of a tire sidewall of a tire with an irregular rough surface texture, the negative irregular rough surface texture pattern defining recessed portions disposed non-uniformly between raised portions, the recessed portions having a depth of at least 0.1 millimeters.

3 Claims, 9 Drawing Sheets

(58) Field of Classification Search
CPC . B29D 2030/728; B60C 13/00; B60C 13/001; B60C 13/02; B60C 13/002
USPC .................. 152/523; 156/130.7; D12/605
See application file for complete search history.

(56) References Cited

U.S. PATENT DOCUMENTS

| | | | |
|---|---|---|---|
| 6,536,490 B2 | 3/2003 | Rooney | |
| 7,156,936 B2 | 1/2007 | Frantz et al. | |
| 7,409,975 B2 | 8/2008 | Wallet | |
| D695,212 S | 12/2013 | Parr | |
| D750,015 S | 2/2016 | Scheifele | |
| D750,553 S | 3/2016 | Scheifele | |
| 2006/0191617 A1 | 8/2006 | Byrne | |
| 2011/0247740 A1* | 10/2011 | Ohara | B60C 13/00 152/454 |
| 2014/0345765 A1* | 11/2014 | Amano | B60C 11/00 152/209.15 |
| 2014/0378030 A1 | 12/2014 | Kemura | |
| 2015/0004335 A1 | 1/2015 | Parr et al. | |
| 2016/0152095 A1 | 6/2016 | Berger et al. | |
| 2017/0080759 A1 | 3/2017 | Parr et al. | |

FOREIGN PATENT DOCUMENTS

| | | | | |
|---|---|---|---|---|
| EP | 0588886 B1 | | 8/1995 | |
| EP | 3030433 A1 | | 6/2016 | |
| FR | 3022851 A1 | | 1/2016 | |
| JP | 11321243 A | * | 11/1999 | ............. B60C 13/02 |
| JP | 2003252012 A | * | 9/2003 | |
| KR | 1020070042679 A | * | 4/2007 | |
| WO | WO-2010143644 A1 | * | 12/2010 | ........... B60C 1/0008 |
| WO | 2015165863 A1 | | 4/2014 | |

OTHER PUBLICATIONS

Hino H, WO-2010143644-A1, machine translation. (Year: 2010).*
Merriam-Webster, Pebble definition, p. 1. (Year: 2009).*
Itabashi S, JP-11321243-A, machine translation. (Year: 1999).*
Lee Heung Goo, KR 1020070042679 A, machine translation. (Year: 2007).*
European Search Report dated Apr. 20, 2021 for Application No. 18858222.5, consisting of 7 pages.
Kevin E Scheifele, Tire Sidewall, U.S. Appl. No. 29/472,944, Nov. 18, 2013.
Kevin E Scheifele, Tire Sidewall, U.S. Appl. No. 29/472,946, Nov. 18, 2013.
Stephen J. Pierre, Tire, U.S. Appl. No. 29/618,592, filed Sep. 22, 2017.
Stephen J. Pierre, Tire, U.S. Appl. No. 29/618,593, filed Sep. 22, 2017.
Stephen J. Pierre, Tire, U.S. Appl. No. 29/618,594, filed Sep. 22, 2017.
Stephen J. Pierre, Tire, U.S. Appl. No. 29/618,597, filed Sep. 22, 2017.
Stephen J. Pierre, Tire, U.S. Appl. No. 29/618,598, filed Sep. 22, 2017.
Stephen J. Pierre, Tire, U.S. Appl. No. 29/618,600, filed Sep. 22, 2017.
Stephen J. Pierre, Tire, U.S. Appl. No. 29/618,601, filed Sep. 22, 2017.
European Search Report dated Jun. 5, 2023 for Application No. 23160356.4, consisting of 8 pages.

* cited by examiner

PNEUMATIC TIRE WITH A TEXTURED SURFACE, METHOD OF MANUFACTURING, AND TEXTURED MOLD

FIELD

The present disclosure relates generally to pneumatic tires, and, more particularly, relates to a tire mold with a negative non-uniform, rough surface texture pattern on the tire sidewall molding surfaces and/or tread molding surfaces of the tire mold for creating a pneumatic tire with a non-uniform, rough surface texture and a pneumatic tire and method of manufacturing the same.

BACKGROUND

It is generally known for tire molding surfaces, especially sidewall tire molding surfaces, of a tire mold to be provided with negative (i.e., mirror image) patterns, such as a negative logo or lettering pattern, which, through the tire molding process, results in the curing of such logo or lettering on the tire sidewall of the cured tire. However, existing tire molds provide uniform patterns that create a specific design, such as a logo, or lettering/numbering, such as a manufacturer's name or tire model number. Likewise, negative tread patterns defined by tread molding surfaces of the tire mold conventionally provide uniform tread patterns.

Some existing tire molds provide negative patterns beyond letters, numbers, or logos for various purposes. For example, one existing tire mold includes ridges that extend in a spiral pattern along the tire molding surface to prevent adhesion of the outer surface of the tire sidewall to the molding surface, which can produce undesirable tire defects. However, such existing patterns on tire molds typically follow a uniform or regular pattern (e.g., linear uniformly spaced apart lines) that repeat or can be followed in a fairly predictable manner. Conventional tire sidewalls include such uniform or regular patterns on their exterior surfaces.

Further, it is generally desirable to provide tire sidewalls with a deep black and moist texture, i.e., glossy. Likewise, it is generally undesirable, i.e., aesthetically unpleasing, for tire sidewalls to have a coarse texture or visually discernible surface irregularities, which are generally considered tire defects or shortcomings.

The inventors have discovered that intentionally providing a non-uniform, rough surface texture finish to a tire sidewall via a negative non-uniform, rough surface texture pattern on the tire mold unexpectedly produces a unique, visually appealing look that differs from the typical glossy surface finish that is conventionally sought after.

SUMMARY

The present disclosure provides a pneumatic tire with a non-uniform rough textured surface finish, method of manufacturing, and mold that overcomes the herein fore-mentioned disadvantages of the heretofore-known devices and methods of this general type.

With the foregoing and other objects in view, there is provided a tire mold having a sidewall molding surface with a negative irregular rough surface texture pattern extending circumferentially along the sidewall molding surface so as to mold at least one annular exterior surface of a tire sidewall of a tire with an irregular rough surface texture, the negative irregular rough surface texture pattern defining recessed portions disposed non-uniformly between raised portions, the recessed portions having a depth of at least 0.1 millimeters.

In accordance with another implementation, the recessed portions and the raised portions vary non-uniformly in size and shape along the sidewall molding surface.

In accordance with yet another implementation, the recessed portions have a depth of 0.1-0.5 millimeters.

In accordance with yet another implementation, the recessed portions have a depth of 0.3 millimeters.

In accordance with yet another implementation, the sidewall molding surface is a surface of a sidewall ring plate.

In accordance with yet another implementation, the negative irregular rough surface texture pattern is configured to mold a rough sandpaper pattern on the at least one annular exterior surface of the tire sidewall, the rough sandpaper pattern being visually discernible from other exterior surfaces of the tire by an observer.

In accordance with another implementation, the negative irregular rough surface texture pattern is configured to mold a pebble pattern on the at least one annular exterior surface of the tire sidewall, the pebble pattern being visually discernible from other exterior surfaces of the tire by an observer.

In accordance with another implementation, the sidewall molding surface defines a negative indicia pattern with an indicia depth that is greater than the depth of the recessed portions so as to mold the at least one annular exterior surface of the tire sidewall with the indicia pattern overlaying the irregular rough surface texture.

In accordance with an additional implementation, the negative irregular rough surface texture pattern is formed by laser etching a planar sidewall molding surface in a non-uniform laser pattern to create the recessed portions, said laser-etched recessed portions thereby defining the raised portions, the raised portions being portions of the planar sidewall molding surface not laser etched.

In accordance with another implementation, the tire mold includes a tread molding surface, the tread molding surface with a negative irregular rough surface texture pattern corresponding to the negative irregular rough surface texture pattern on the sidewall molding surface so as to mold at least one annular exterior surface of a tire tread with an irregular rough surface texture corresponding to the irregular rough surface texture of the tire sidewall.

In accordance with yet another implementation, the negative irregular rough surface texture pattern extends circumferentially continuously 360 degrees along the sidewall molding surface.

In accordance with yet another implementation, the tire mold includes a sidewall molding surface with a negative irregular rough surface texture pattern extending circumferentially along the sidewall molding surface so as to mold at least one annular exterior surface of a tire sidewall of a tire with an irregular rough surface texture, the negative irregular rough surface texture pattern having an irregularity depth of at least 0.1 millimeters.

In accordance with another implementation, the irregularity depth is in a range of 0.1-0.5 millimeters.

In accordance with yet another implementation, the irregularity depth is 0.3 millimeters.

In accordance with yet another implementation, the sidewall molding surface is a surface of a sidewall ring plate.

In accordance with yet another implementation, the negative irregular rough surface texture pattern is configured to mold one of a rough sandpaper pattern, and a pebble pattern on the at least one annular exterior surface of the tire sidewall, the one of the rough sandpaper pattern, and the pebble pattern being visually discernible from other exterior surfaces of the tire by an observer.

In accordance with another implementation, a pneumatic tire including a first and a second sidewall each axially spaced apart from one another and extending from respective opposite ends of a tread; and at least one of the first and second sidewalls having an annular exterior surface with an irregular rough surface texture. The irregular rough surface texture: has an irregularity depth of at least 0.1 millimeters, is integrally formed on the annular exterior surface, and is formed so as to provide a non-uniform, coarse surface texture finish that extends circumferentially along the annular exterior surface of the at least one of the first and second sidewalls.

Although various implementations are illustrated and described herein as embodied in a pneumatic tire with a textured surface, method of manufacturing, and textured mold, the disclosure is, nevertheless, not intended to be limited to the details shown because various modifications and structural changes may be made therein without departing from the spirit of the disclosure and within the scope and range of equivalents of the claims. Additionally, well-known elements of exemplary embodiments will not be described in detail or will be omitted so as not to obscure the relevant details of the disclosure.

Other features that are considered as characteristic of the disclosure are set forth in the appended claims. As required, detailed embodiments of the present disclosure are disclosed herein; however, it is to be understood that the disclosed embodiments are merely exemplary, which can be embodied in various forms. Therefore, specific structural and functional details disclosed herein are not to be interpreted as limiting, but merely as a basis for the claims and as a representative basis for teaching one of ordinary skill in the art to variously employ the present disclosure in virtually any appropriately detailed structure. Further, the terms and phrases used herein are not intended to be limiting; but rather, to provide an understandable description of the disclosure. While the specification concludes with claims defining the features of the disclosure that are regarded as novel, it is believed that the disclosure will be better understood from a consideration of the following description in conjunction with the drawing figures, in which like reference numerals are carried forward. The figures of the drawings are not drawn to scale.

It is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the tire mold.

As used herein, the terms "axial" and "axially" is intended to indicate lines or directions that are parallel to the axis of rotation of a tire. The terms "radial" and "radially" are defined as lines or directions radially toward or away from the axis of rotation of the tire. "Circumferential," as used herein, is intended to indicate circular lines or directions extending along the surface of the annular sidewall or the annular sidewall molding surface, perpendicular to the axial direction.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present disclosure.

DETAILED DESCRIPTION

While the specification concludes with claims defining the features of the disclosure that are regarded as novel, it is believed that the disclosure will be better understood from a consideration of the following description in conjunction with the drawing figures, in which like reference numerals are carried forward. It is to be understood that the disclosed embodiments are merely exemplary and can be embodied in various forms.

The present disclosure provides a novel and efficient tire mold, pneumatic tire, and method of producing the same with an irregular rough surface texture finish on the annular exterior surfaces of the tire that provides a unique textured visual appearance. Embodiments include irregular rough surface texture finishes with recessed portions non-uniformly disposed between irregular raised portions on a tire sidewall. In addition, embodiments of include the recessed portions having an irregularity depth of between 0.1 millimeters and 0.5 millimeters. As used herein, the term "between" and the ranges recited herein are intended to be inclusive of the outer limits defining the range (e.g., inclusive of 0.1 millimeters and 0.5 millimeters). In one embodiment, the rough surface texture finish may resemble rough sandpaper and, in an alternative embodiment, the rough surface texture finish may resemble a non-uniformly spaced apart pebble arrangement.

Figure 1:
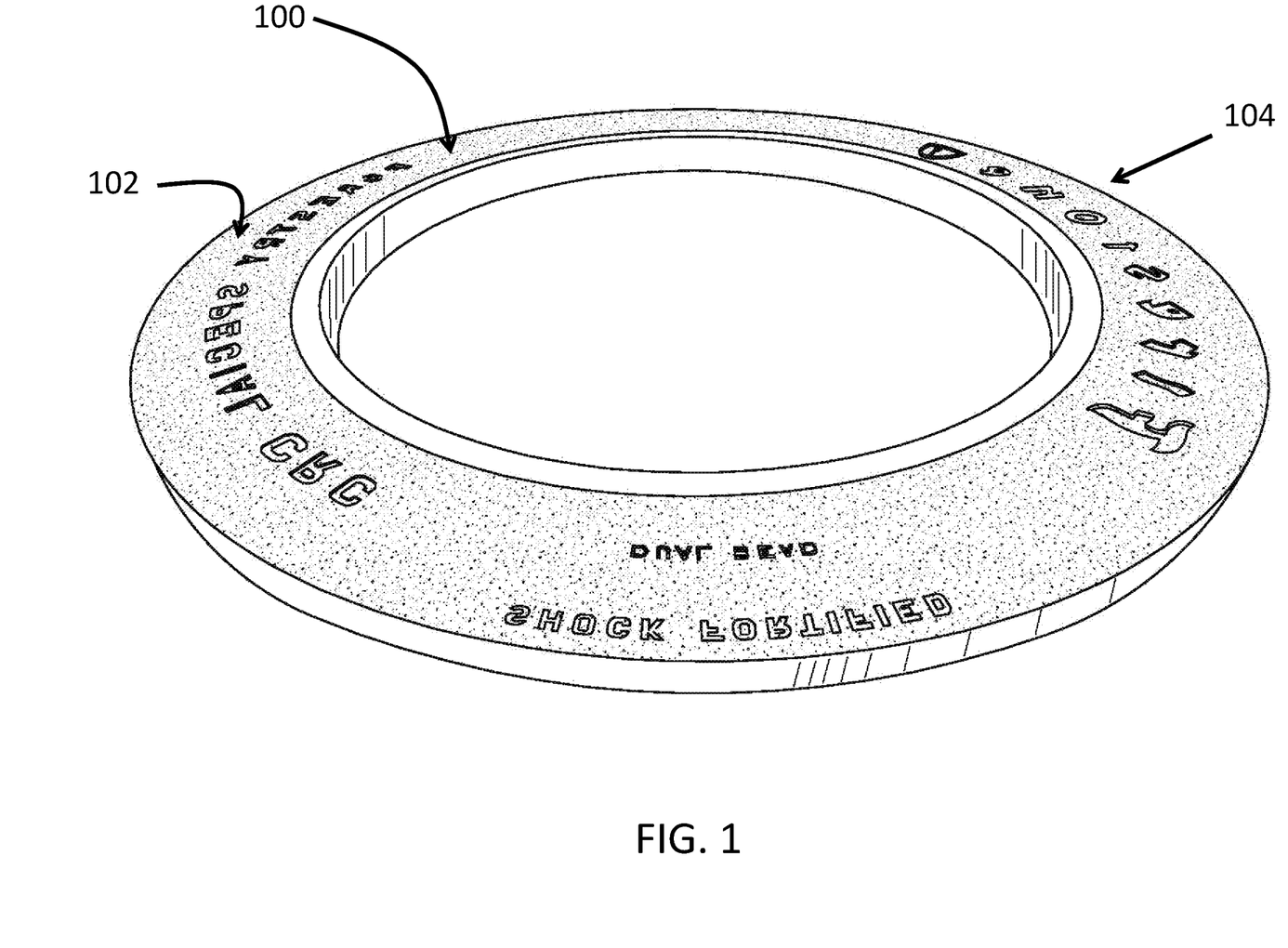
FIG. 1 is a perspective view of a sidewall molding surface of a tire mold with a negative, irregular rough surface texture pattern extending circumferentially along the annular surface, in accordance with an embodiment of the present disclosure.

Referring now to FIG. 1, one embodiment is shown in a perspective view. FIG. 1 shows several advantageous features of the present disclosure, but, as will be described below, the embodiments can be provided in several shapes, sizes, combinations of features and components, and varying numbers and functions of the components. The first example of a tire molding surface 100 with a negative irregular rough surface texture pattern 102, as shown in FIG. 1, is provided in the form of a sidewall ring plate 104.

As will be discussed herein below, with reference to FIGS. 8 and 9, a tire mold 900 used in accordance with the present disclosure may be a three-piece tire mold with a pair of sidewall ring plates 104a and 104b (for each sidewall) and a tread molding portion 902 (see FIG. 9). The sidewall molding surfaces in accordance with the present disclosure will be discussed with reference to the annular surface of the sidewall ring plate 104; however, it should be understood that some alternative embodiments may provide for sidewall molding surfaces in other types of tire molds, such as a one-piece tire mold in which the sidewall molding surfaces and the tread molding surfaces are integral with one another.

As can be seen in FIG. 1, in a preferred embodiment, the negative irregular rough surface texture pattern 102 extends circumferentially along substantially the entire sidewall molding surface 100, except for the portions of the sidewall molding surface with lettering-numbering and/or logos. Stated another way, the negative irregular rough surface texture pattern 102 may extend circumferentially continuously 360 degrees along the sidewall molding surface 100. Accordingly, as a result of a green tire 800 being cured in the tire mold 900 (see FIG. 9), an annular exterior surface 1000 of a tire sidewall 1002 is provided with an irregular rough surface texture finish 1004 that extends continuously circumferentially along the tire sidewall 1002 (see FIG. 10). As should be apparent to those of ordinary skill in the art, the negative pattern 102 on the sidewall molding surface 100 should be a mirror image of the resulting pattern on the cured tire sidewall 1002.

In another embodiment, the negative irregular rough surface texture pattern 102 may extend circumferentially less than 360 degrees along the sidewall molding surface 100, such as, for example 270 degrees, 180 degrees, or 90 degrees along the sidewall molding surface 100. As should be apparent to those of ordinary skill in the art, the negative pattern 102 on the sidewall molding surface 100 should be a mirror image of the resulting pattern on the cured tire sidewall 1002.

In yet other embodiments, the negative irregular rough surface texture pattern 102 may extend discontinuously, circumferentially along the sidewall molding surface 100. In other words, the negative irregular rough surface texture pattern 102 may have intervals or gaps between sub-sections of the negative irregular rough surface texture. The intervals or gaps may be formed as smooth surfaces to contrast with the irregular rough surface texture sub-sections. Alternatively, the intervals or gaps between sub-sections of the negative irregular rough surface texture may be formed as a different/alternating negative irregular rough surface texture sub-sections. In a further embodiment, the negative irregular rough surface texture sub-sections may be equally spaced apart from one another. As should be apparent to those of ordinary skill in the art, a discontinuous, negative pattern 102 on the sidewall molding surface 100 should be a mirror image of the resulting pattern on the cured tire sidewall 1002.

Figure 2:
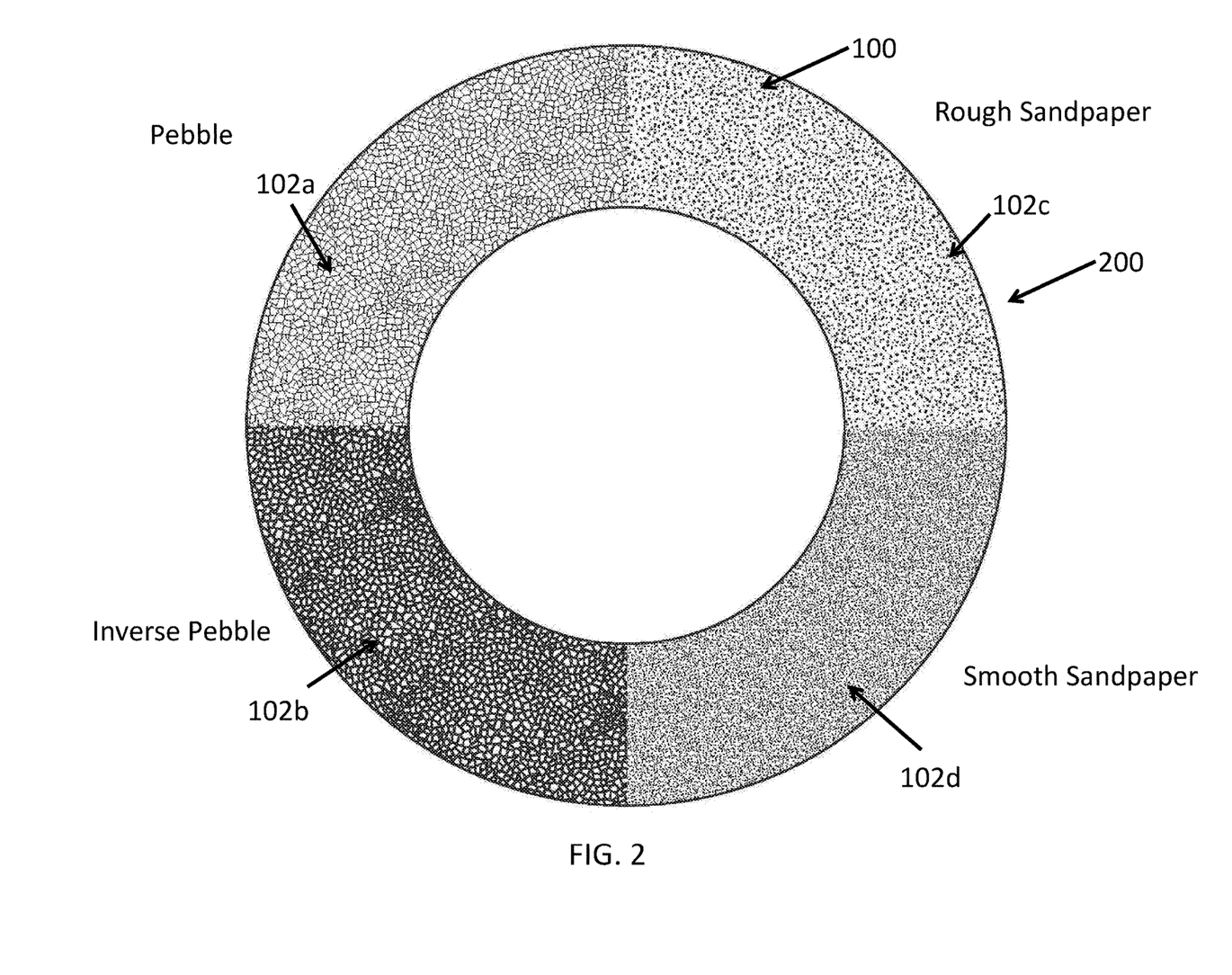
FIG. 2 is a front elevational view of a sidewall molding surface of a tire mold, illustrating four distinct exemplary negative irregular rough surface texture patterns, in accordance with the present disclosure.

Referring now primarily to FIG. 2, a sidewall ring plate 200 (similar to the sidewall ring plate 104 depicted in FIG. 1) is shown in a front elevational view with multiple negative irregular rough surface texture patterns 102a, 102b, 102c, and 102d. Although preferred embodiments include the sidewall molding surface 100 with a single irregular rough surface texture pattern 102 extending circumferentially along the molding surface 100, as illustrated in FIG. 1; for illustrative purposes the sidewall ring plate 200 shown in FIG. 2 includes four patterns 102a, 102b, 102c, 102d on each quarter of the molding surface 100 for purposes of describing the various rough surface patterns that may be provided in accordance with various embodiments of the present disclosure.

In the exemplary embodiment, the negative irregular rough surface texture pattern 102 defined on the sidewall molding surface 100 may be considered a pebble pattern 102a. Stated another way, the negative irregular rough surface texture pattern 102 may be configured to mold a pebble pattern on the annular exterior surface 1000 of the tire sidewall 1002.

Figure 4:
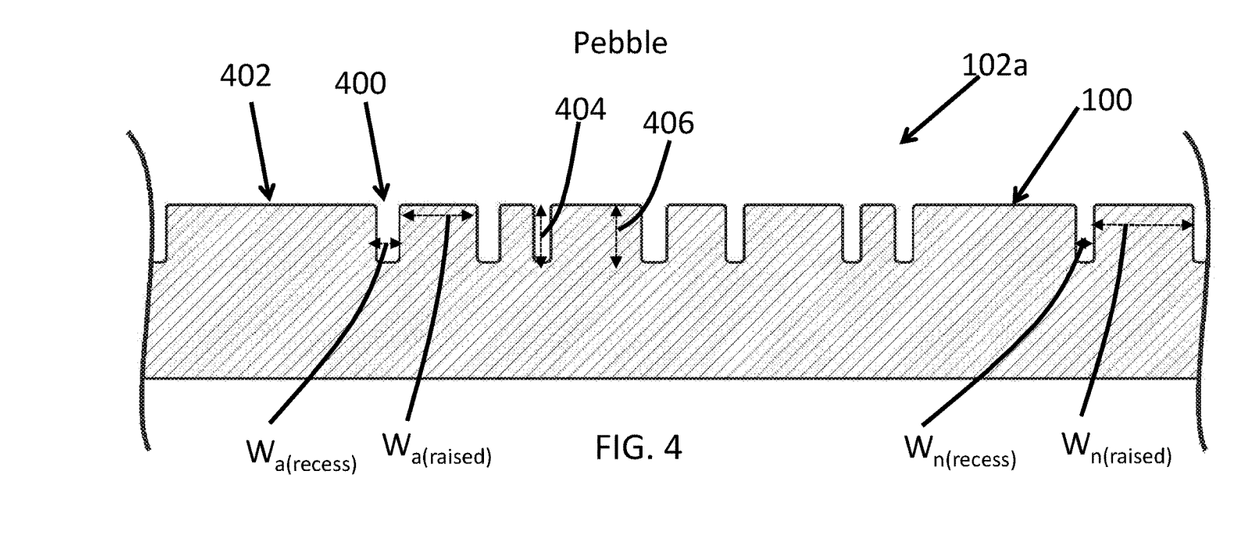
FIG. 4 is a cross-sectional view of the sidewall molding surface of FIG. 2, illustrating raised and recessed portions of a pebble pattern, in accordance with the present disclosure.

Referring now specifically to FIG. 4, with reference still to FIG. 2, the negative irregular rough surface texture pattern 102 (shown in FIG. 4 as a cross-section of the pebble pattern 102a) may define recessed portions 400 disposed non-uniformly between raised portions 402. The raised portions 402 may be the irregular-shaped pebble portions of the pattern 102a and the recessed portions 400 may be the irregular-shaped spaces between pebble portions of the pattern 102a. The pebble portions may be considered generally circular or oval in overall shape, yet follow an irregular curve-shaped path/outline, similar to the irregular-shape of pebbles, hence the name "pebble pattern." The spaces between the pebble portions may be non-linear and non-uniform in dimension in some embodiments (as shown in FIG. 4).

The recessed portions 400 and the raised portions 402 may be considered to vary non-uniformly in size and shape, one from another, along the sidewall molding surface 100. Stated another way, the dimensions of the recessed portions 400 and the dimensions of the raised portions 402 may vary randomly along the sidewall molding surface 100. In particular, FIG. 4 shows an embodiment in which the widths of the recessed portions 400, $W_{a(recess)}$–$W_{n(recess)}$, vary non-uniformly one from the other. Similarly, FIG. 4 shows an embodiment in which the widths of the raised portions 402, $W_{a(raised)}$–$W_{n(raised)}$, vary non-uniformly one from the other. The number of raised portions 402 and the number of recessed portions 400 may be any number from a to n.

In one embodiment, the raised portions 402 may have a maximum width, $W_{a(raised)}$, or diameter that is 1.5 millimeters. In another embodiment, the raised portions 402 may have a maximum width, $W_{a(raised)}$, that is 1 millimeter. In yet another embodiment, the raised portions 402 may have a maximum width, $W_{a(raised)}$, that is 2.5 millimeters. In yet other embodiments, the raised portions 402 may have a maximum width, $W_{a(raised)}$, that is outside of those ranges.

In some embodiments, a width and a depth of the recessed portions 400 may be the same across the pattern 102, yet the path and shape of the recessed portions 400 may still be irregular and follow a non-uniform path across the pattern 102. This may be the case, for example, in embodiments in which a laser beam may be used to etch an irregular pattern on a generally planar steel plate. The laser beam may create recessed portions 400 that have substantially the same width and depth (corresponding to the strength and size of the laser beam); however, the path that the laser beam follows should be irregular or non-uniform to create an irregular, non-uniform rough surface texture on the molding surface 100.

Similarly, a height of the raised portions 402 may, in some embodiments, be the same across the pattern 102, yet the shape and/or width of the raised portions 402 may be irregular and non-uniform across the pattern 102. In other words, the shape of one raised portion 402 may be different from the shape of its neighboring raised portion 402, as with actual pebbles (see for example FIG. 2 pebble)

The recessed portions 400 and raised portions 402 should be provided with dimensions that create an irregular rough surface texture finish 1004 on the tire sidewall 1002 (see FIGS. 10 and 11) that is visually discernable by an outside observer. In other words, the irregular rough surface texture finish 1004 (whether it resembles sandpaper or a pebble pattern) should be visually discernible as compared to the other exterior surfaces of the tire. Stated yet another way, the irregular rough surface texture finish 1004 should be configured as an apparent tire sidewall pattern that was intentionally created to provide a unique visual effect on the tire sidewall 1002, as opposed to mere random surface defect irregularities that may only be visible by a very close-up tire inspection.

In one embodiment, the negative irregular rough surface texture pattern 102 may be provided with dimensions to create an irregular rough surface texture finish 1004 on the tire sidewall 1002 (see FIGS. 10 and 11) that is visually discernible by an observer from at least 5 feet away from the tire sidewall 1002. In yet another embodiment, the irregular rough surface texture finish 1004 may be configured to be visually discernible by an observer from at least 10 feet away from the tire sidewall 1002. Importantly, the irregular rough surface texture finish 1004 should provide a unique look and feel to the tire sidewall 1002, which departs from the conventional glossy sidewall appearance that is sought after, or the uniform regular tire sidewall patterns existing in the art today.

In one embodiment, the recessed portions 400 have a depth 404 of at least 0.1 millimeters. In another embodiment, the recessed portions 400 may have a depth 404 that is 0.3 millimeters. In yet another embodiment, the recessed portions 400 may have a depth 404 that is 0.5 millimeters. In yet another embodiment, the recessed portions 400 may have a depth 404 of between 0.1 to 0.5 millimeters. The depth 404 of the recessed portions 400 may also be referred to as an irregularity depth.

A height 406 of the raised portions 402 may correspond to the depth 404 of the recessed portions 400. For example, in an embodiment where a smooth/planar sidewall molding surface is laser etched with an irregular rough surface texture pattern to create the rough textured, sidewall ring plate 104, the laser beam may create the recessed portions 400, which thereby define the raised portions 400. In other words, the raised portions 400 may be considered the remaining surfaces of the planar sidewall molding surfaces that were not cut/etched by the laser beam. Accordingly, in some embodiments, the raised portions 402 may have a height 406 of at least 1 millimeter. In another embodiment, the raised portions 402 may have a height 406 that is 0.3 millimeters. In yet another embodiment, the raised portions 402 may have a height 406 that is 0.5 millimeters. In yet another embodiment, the raised portions 402 may have a height 406 of between 0.1 to 0.5 millimeters.

The amount and dimensions of the raised portions 402 and the amount and dimensions of the recessed portions 400 should preferably be selected to be sufficiently substantial to be visually discernible by an outside observer, but also not too large to be susceptible to cracks in the tire sidewall. For example, while a greater depth 404 of the recessed portions 400 and a greater height 406 of the raised portions 402 may be more visually discernible to an outside observer for some patterns, if the recessed portions 400 are too deep over time the tire sidewall may be at an unacceptable risk of forming cracks too early in the tire life cycle.

Although the description thus far has been primarily focused on describing the negative irregular rough surface texture pattern 102, with reference to the pebble pattern 102a depicted in FIGS. 2 and 4, it should be understood that other embodiments may provide other types of irregular rough surface texture patterns 102b, 102c, and 102d. The description herein above with respect to the dimensions of the raised portions 402 and the recessed portions 400 and other arrangements and configurations of the negative irregular rough surface texture pattern 102 apply also with respective to such alternative patterns 102b, 102c, and 102d.

Figure 5:
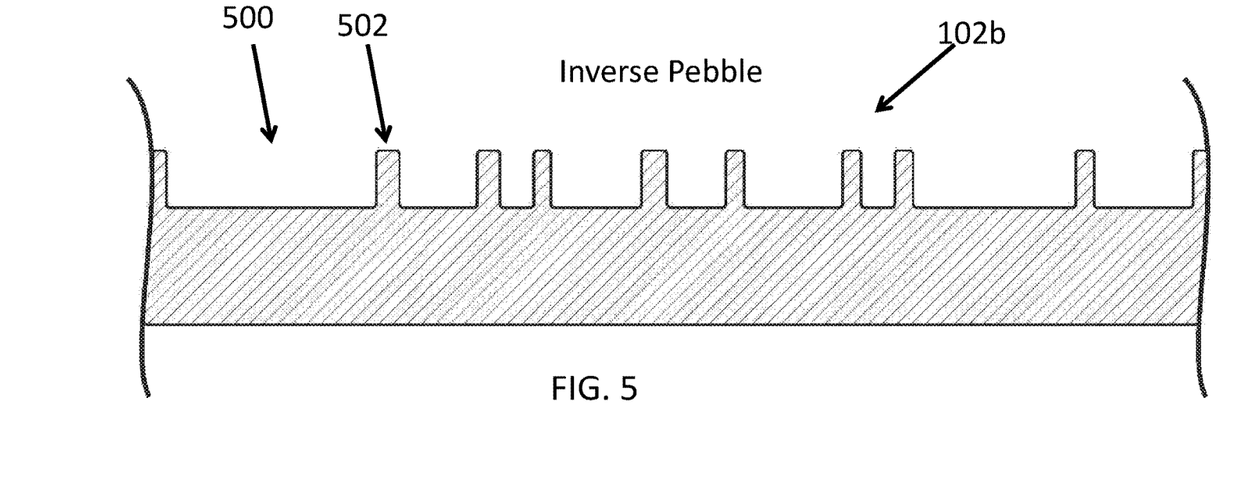
FIG. 5 is a cross-sectional view of the sidewall molding surface of FIG. 2, illustrating raised and recessed portions of an inverse pebble pattern, in accordance with the present disclosure.

Referring now again to FIG. 2, the sidewall ring plate 200 illustrates various alternative negative irregular rough surface texture patterns 102a-d. The pattern 102b may be considered an inverse pebble pattern 102b. FIG. 5 illustrates a close-up view of a portion of the inverse pebble pattern 102b. With the inverse pebble pattern 102b, the recessed portions 500 and the raised portions 502 are the inverse of the pebble pattern 102a. Specifically, the raised portions 502 correspond to the irregular-shaped spaces between the pebble portions and the recessed portions 500 correspond to the irregular-shaped pebble portions. As described herein above, the irregular-shaped pebble portions are considered generally circular or oval in overall shape, yet follow an irregular curve-shaped path/outline, similar to the irregular-shape of pebbles, hence the name "pebble pattern." The description herein above with respect to the dimensions and arrangement of the pebble pattern 102a apply also to the inverse pebble pattern 102b and therefore will not be expressly repeated.

Figure 3:
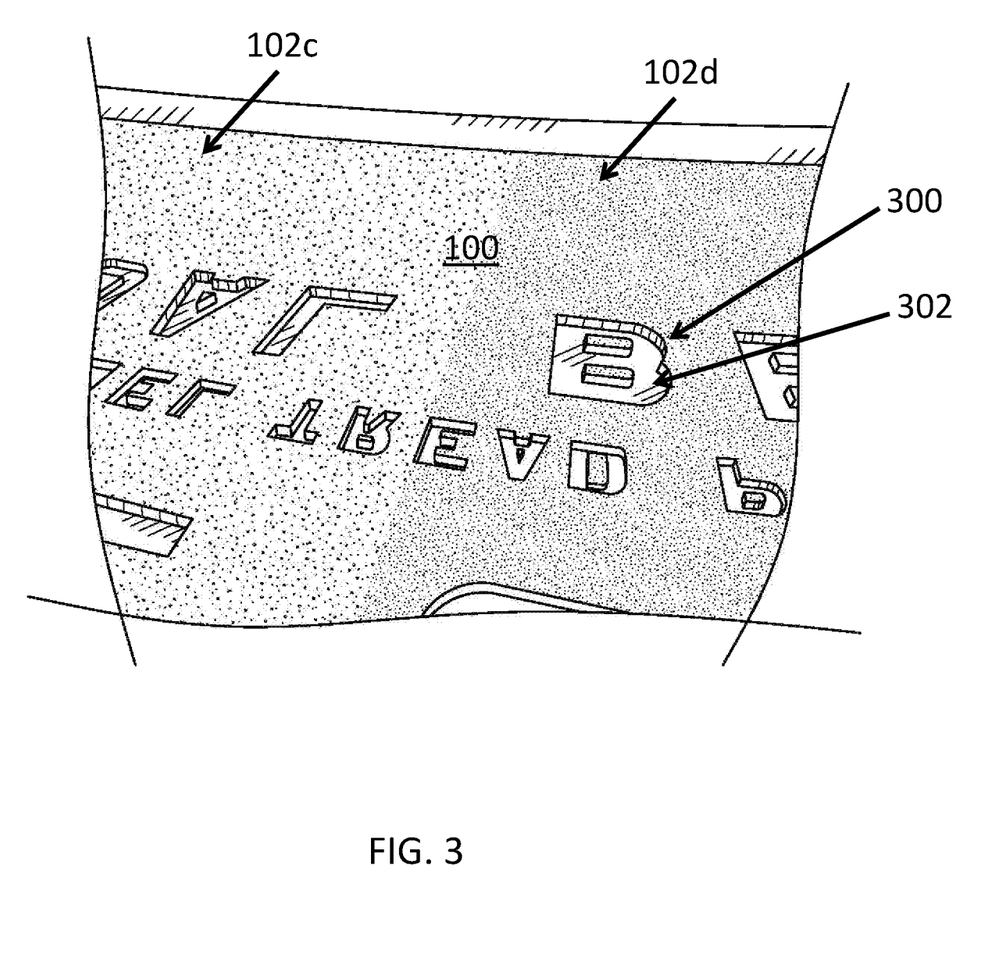
FIG. 3 is a fragmentary, enlarged perspective view of the sidewall molding surface of FIG. 2, illustrating the negative sidewall lettering pattern, in accordance with the present disclosure.
Figure 6:
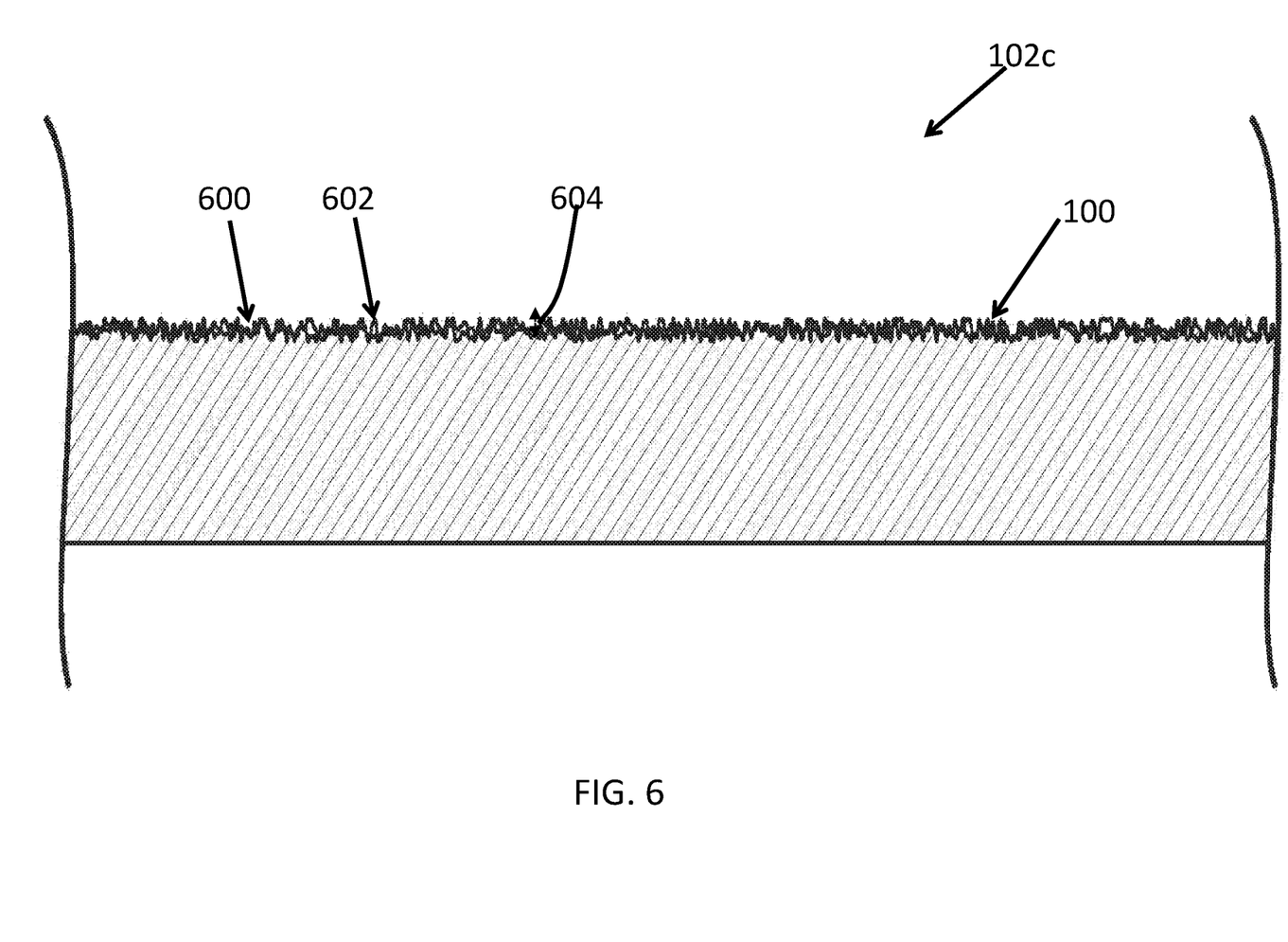
FIG. 6 is a cross-sectional view of the sidewall molding surface of FIG. 2, illustrating raised and recessed portions of a rough sandpaper pattern, in accordance with the present disclosure.

Referring again to FIG. 2, with reference also to FIGS. 3 and 6, the pattern 102c may be considered a rough sandpaper pattern 102c. As with the pebble patterns 102a and 102b, the rough sandpaper pattern 102c may include recessed portions 600 disposed non-uniformly between raised portions 602 in a manner that resembles a sandpaper surface. In a preferred embodiment, the recessed portions 600 may have a depth 604 of 0.1 millimeters. In a further embodiment, the sidewall molding surface 100 may be created by laser etching a smooth sidewall ring plate with cuts 0.1 millimeters deep. In other embodiments, the depth 604 may be slightly greater or less than 0.1 millimeters. In yet other embodiments, the depth 604 of the recessed portions 600 may be in the range of 0.1 millimeters to 0.3 millimeters. In yet further embodiments, the depth 604 of the recessed portions 600 may be in the range of 0.1 to 0.5 millimeters. Importantly, the cuts or depth of the recessed portions 600 and the overall arrangement of recessed portions 600 and raised portions 602 should appear intentionally coarse, in other words, resembling rough sandpaper. FIG. 3 is a close-up view of the sandpaper patterns 102c, 102d on the sidewall molding surface 100.

As with real sandpaper, the texture of the sandpaper pattern 102c, 102d can vary in terms of its coarseness or grit. Generally, the size of the grain, or in this case the dimensions of the raised portions 602, is proportional to the coarseness of the sandpaper surface. The pattern 102d may be considered a smooth sandpaper pattern 102d, as compared to the rough sandpaper pattern 102c.

Figure 10:
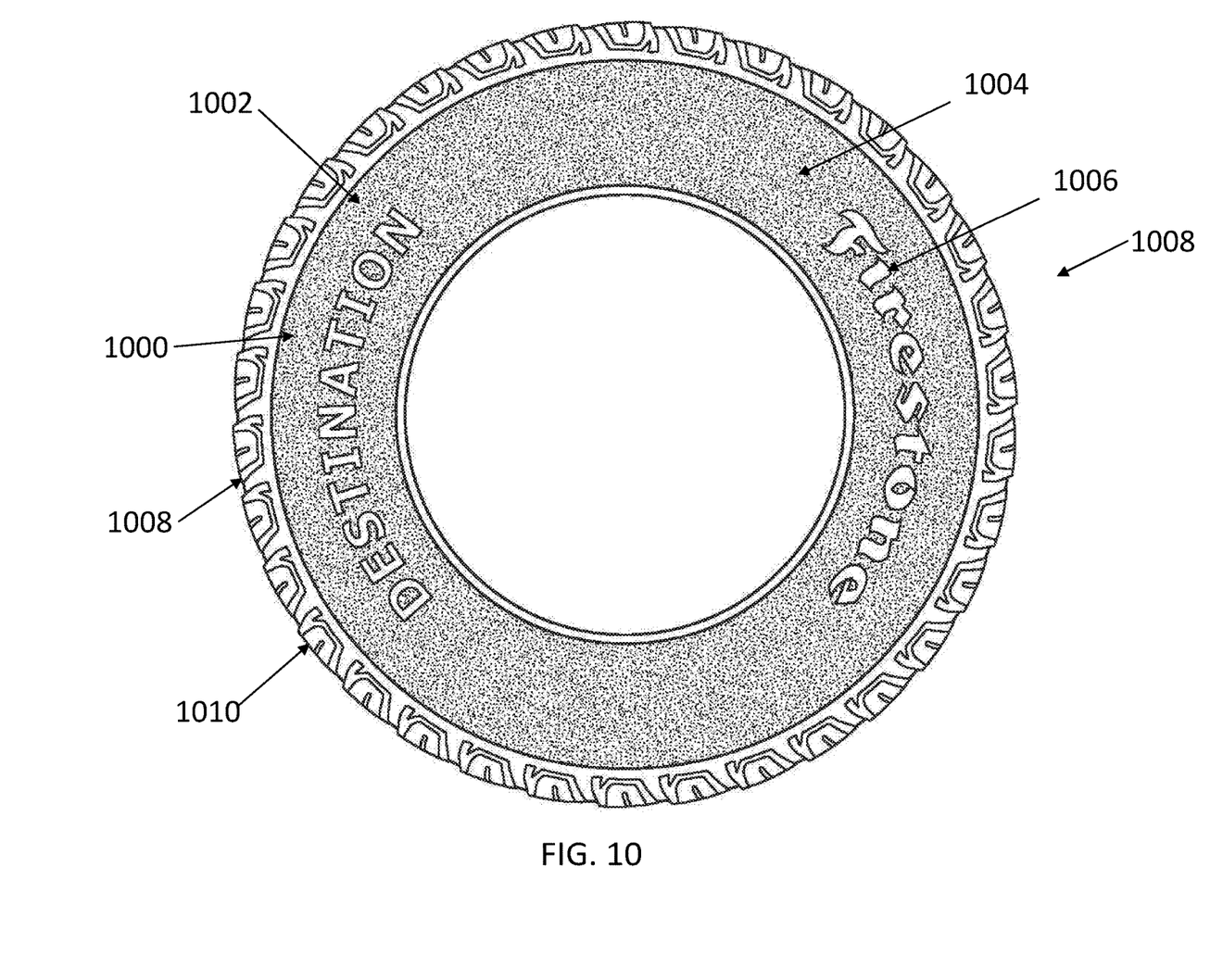
FIG. 10 is a side elevational view of a pneumatic tire with an irregular rough surface sandpaper texture finish extending circumferentially along the annular exterior surface of the tire sidewall, in accordance with the present disclosure.

Referring now primarily to FIG. 3, with reference to FIG. 10, the sidewall molding surface 100 may also define a negative indicia pattern 300 overlaying the negative irregular rough surface texture patterns 102c, 102d. The negative indicia pattern 300 may include a negative space in the mold for creating sidewall lettering, manufacturer names, tire model information, and the like, and may include letters, numbers, as well, as other symbols, such as logos. In one embodiment, the negative indicia pattern 300 may include an indicia depth 302 that is greater than the depth of the recessed portions 600 so as to mold the annular exterior surface 1000 of the tire sidewall 1002 with sidewall indicia 1006 (see FIG. 10). The sidewall indicia 1006 preferably protrudes outwardly extending beyond the irregular rough surface texture finish 1004 created by the mold texture pattern 102. In other words, the sidewall indicia 1006 preferably overlays the irregular rough surface texture finish 1004.

Figure 7:
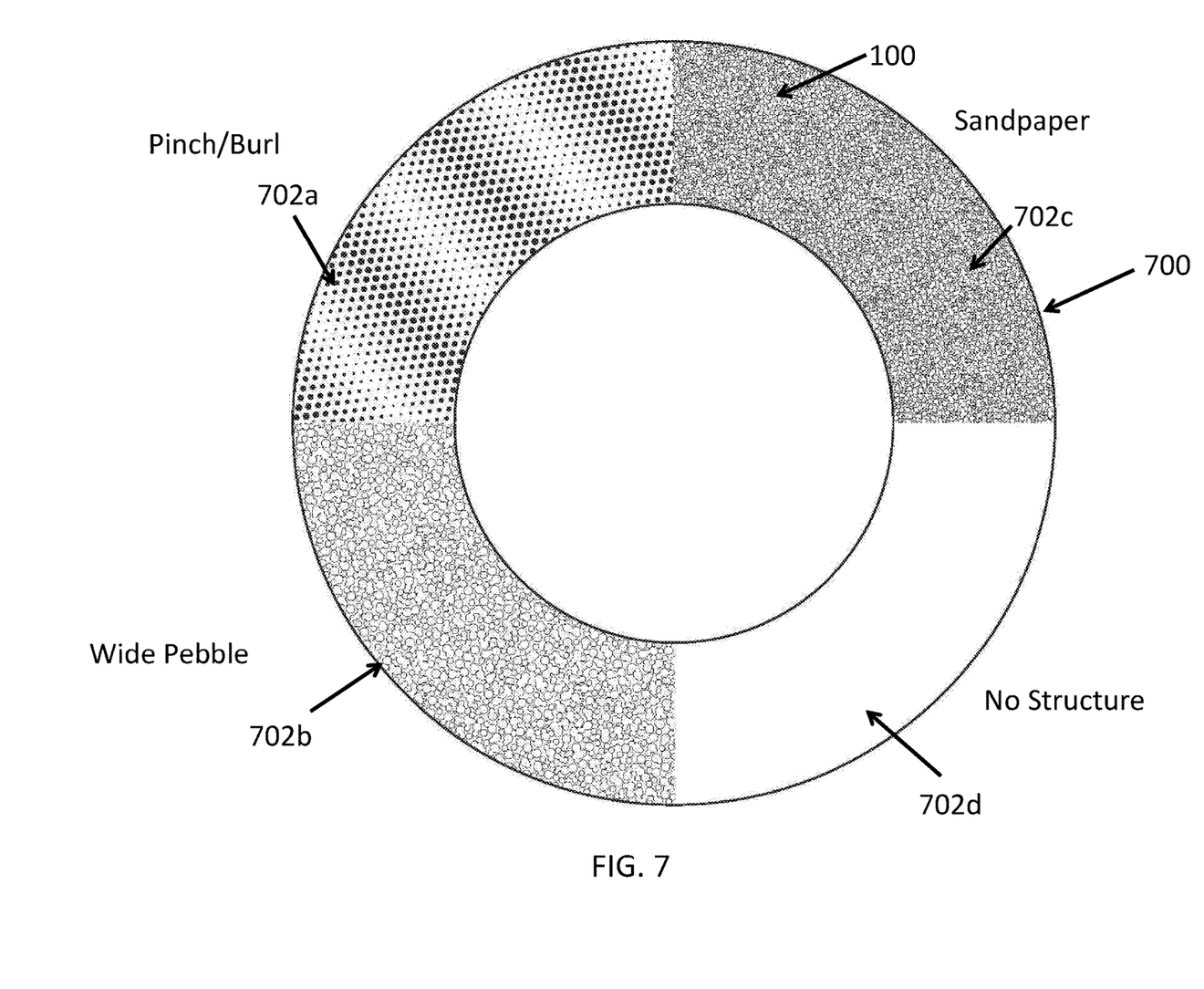
FIG. 7 is a front elevational view of yet another sidewall molding surface of a tire mold, illustrating yet another set of four distinct exemplary negative irregular rough surface texture patterns, in accordance with the present disclosure.

Referring now primarily to FIG. 7, yet another exemplary sidewall ring plate 700 (similar to the sidewall ring plate 104 depicted in FIG. 1 and the sidewall ring plate 200 depicted in FIG. 2) is shown in a front elevational view with multiple negative irregular rough surface texture patterns 702a, 702b, 702c. The negative irregular rough surface texture pattern 702a may be considered a pinch or burl effect pattern, with raised and protruding portions arranged to resemble a pinch or burl effect, as depicted in FIG. 7. The negative irregular rough surface texture pattern 702b may be considered a wide pebble pattern, with protruding portions more widely spaced apart than the other pebble patterns 102a and 102b (FIGS. 2, 4, and 5). The negative irregular rough surface texture pattern 702c may be considered yet another sandpaper pattern with a different coarseness, as compared to the other sandpaper patterns 102c and 102d (FIGS. 2 and 6). The finish 702d may be considered a no structure, prior art pattern, having, for example, a smooth or a polished finish on the sidewall molding surface 100, shown as a comparison of embodiments of the present disclosure to existing mold surfaces.

Figures 8, 9:
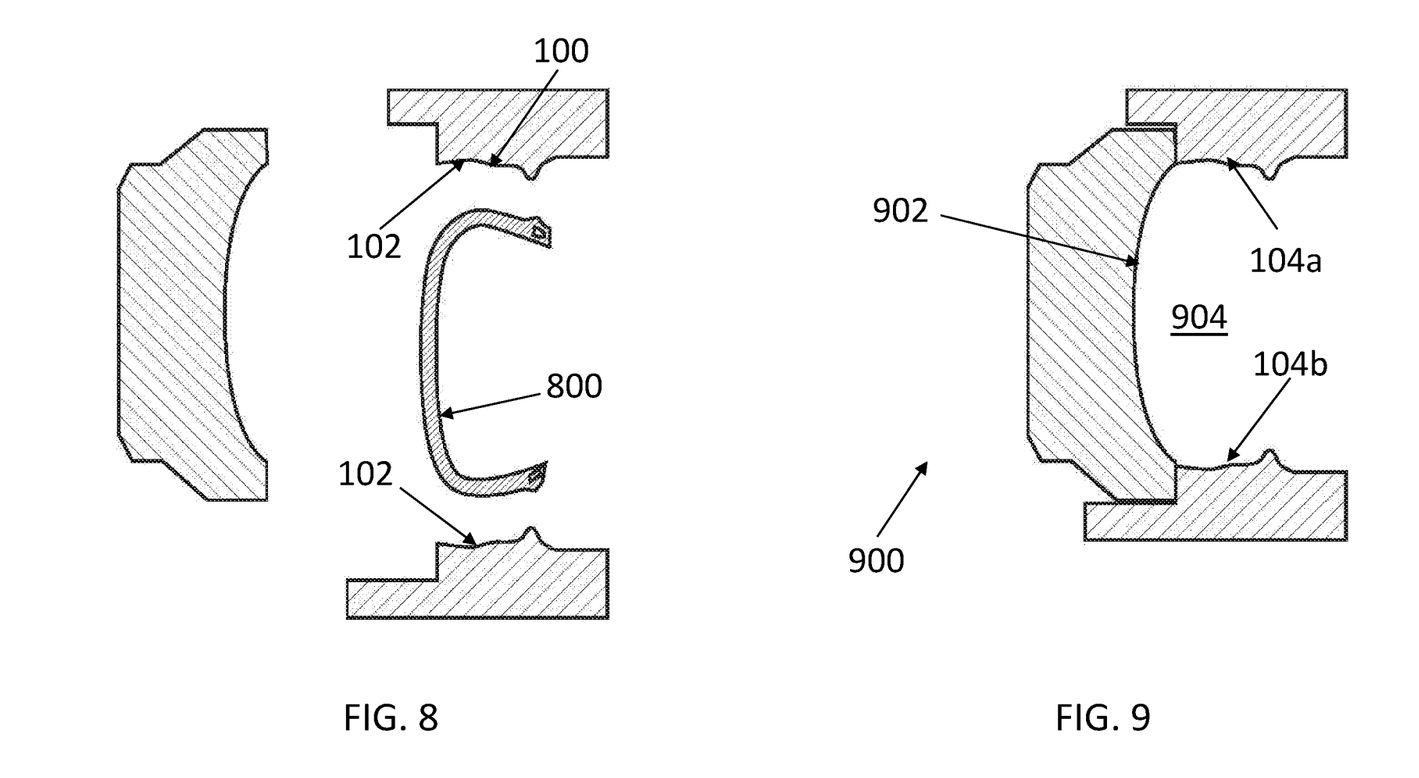
FIG. 8 is a cross-sectional, expanded view of a three-piece tire mold, illustrating cross-sections of a pair of sidewall rings and a tread molding portion, in accordance with the present disclosure.
FIG. 9 is a cross-sectional, assembled view of the three-piece tire mold of FIG. 8, illustrating cross-sections of the pair of sidewall rings and the tread molding portion assembled together to create a tire molding cavity, in accordance with the present disclosure.

Referring now primarily to FIGS. 8 and 9, a cross-sectional view of the tire mold 900 is shown as a three-piece mold with the pair of sidewall ring plates 104a and 104b (for each sidewall) and the tread molding portion 902. The general construction of tire molds is known by those of ordinary skill in the art and therefore will not be described in great detail. In the exemplary embodiment, the negative irregular rough surface texture pattern 102 is provided on the sidewall molding surfaces 100 of the sidewall ring plates 104a, 104b. Specifically, the negative irregular rough surface texture pattern 102 may extend circumferentially along each of the sidewall ring plates 104a, 104b.

As is generally known, the tread molding portion 902 may include a negative tread pattern. In a further embodiment, there may also be provided a negative irregular rough surface texture pattern 102 on the tread molding portion 902 to provide a unique visual effect on the annular exterior surface 1000 of the tire tread 1010, as well. In one embodiment, the irregular rough surface texture of the tire tread 1010 may be configured to resemble the irregular rough surface texture finish 1004 of the tire sidewall 1002. In other embodiments, the tread molding portion 902 may not include a negative irregular rough surface texture pattern 102. Because tire sidewalls are more visually prominent than the tire tread 1010 when installed on a vehicle, embodiments may only provide the irregular rough surface texture finish 1004 on the tire sidewall 1002, rather than the tire tread 1010.

During the manufacturing process, the green tire 800 may be placed within the tire mold cavity 904 defined by the tread and sidewall molding surfaces of the tire mold 900, as is generally known. After curing the green tire 800, a pneumatic tire 1008 is formed with the irregular rough surface texture finish 1004 on the tire sidewall 1002 (see FIG. 10), the irregular rough surface texture finish 1004 being a mirror image of the negative irregular rough surface texture pattern 102 on the sidewall ring plate 104 (see FIGS. 1 and 2).

As is generally known, a tire includes a pair of tire sidewalls axially spaced apart from one another and extending from respective opposite ends of the tire tread 1010. Accordingly, although not shown, it should be apparent that the opposite tire sidewall (not shown in FIG. 10) also includes the irregular rough surface texture finish 1004.

Figure 11:
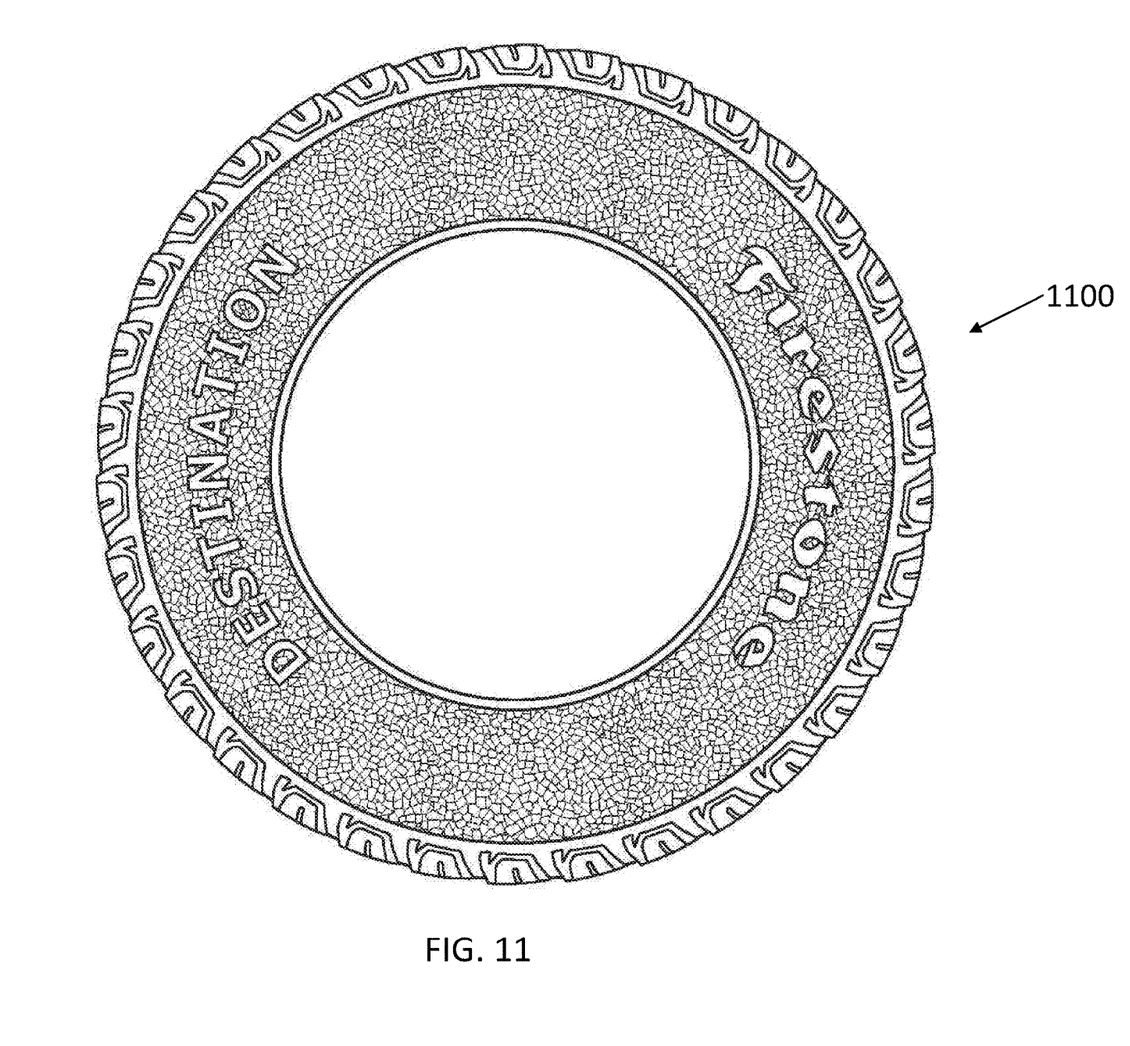
FIG. 11 is side elevational view of a pneumatic tire with an irregular rough surface pebble texture finish extending circumferentially along the annular exterior surface of the tire sidewall, in accordance with the present disclosure.

FIG. 10 illustrates the pneumatic tire 1008 made with a sidewall molding surface having the rough sandpaper pattern 102c thereon, in accordance with the present disclosure. FIG. 11 illustrates another exemplary pneumatic tire 1100 made with a sidewall molding surface having the pebble pattern 102a thereon, in accordance with the present disclosure.

By providing the tire mold 900 with negative irregular rough surface texture patterns 102, 702, the irregular rough surface texture finish 1004 may be formed integrally with the tire sidewall 1002, rather than, for example, being molded onto the tire, after the green tire 800 is cured, as a separate manufacturing process. Doing so reduces the time, cost, and complexity of the manufacturing process, as compared with, for example, a process with a separate post-curing step.

A novel and efficient tire mold, pneumatic tire, and method of producing the same has been disclosed to provide an irregular rough surface texture finish on the annular exterior surface of the tire that provides a unique textured visual appearance. Embodiments provide irregular rough surface texture finishes with recessed portions non-uniformly disposed between irregular raised portions on a tire sidewall. In one embodiment, the rough surface texture finish may resemble rough sandpaper and, in an alternative embodiment, the rough surface texture finish may resemble a non-uniformly spaced apart pebble arrangement.

What is claimed is:

1. A pneumatic tire comprising:
a first and a second sidewall each axially spaced apart from one another and extending from respective opposite ends of a tread; and
at least one of the first and second sidewalls having an annular exterior surface with an irregular rough surface texture, the irregular rough surface texture:
being integrally formed on the annular exterior surface as a pebble pattern, the pebble pattern being visually discernible from other exterior surfaces of the pneumatic tire by an observer, the pebble pattern being formed by a plurality of irregular recessed portions and a plurality of raised portions of the annular exterior surface, the plurality of irregular recessed portions each being generally oval shaped and bounded by an irregular curve-shaped path, the plurality of irregular recessed portions varying non-uniformly in size, the plurality of recessed portions and raised portions having substantially flat surfaces and the plurality of irregular recessed portions recessed into the tire sidewall with respect to the plurality of raised portions and having an irregularity depth of at least 0.1 millimeters; and
formed so as to provide a non-uniform, coarse surface texture finish that extends circumferentially along the annular exterior surface of the at least one of the first and second sidewalls.

2. The pneumatic tire in accordance with claim 1, wherein:
the irregularity depth is in a range of 0.1-0.5 millimeters.

3. The apparatus in accordance with claim 1, wherein:
the irregularity depth is 0.3 millimeters.

* * * * *